UNITED STATES PATENT OFFICE.

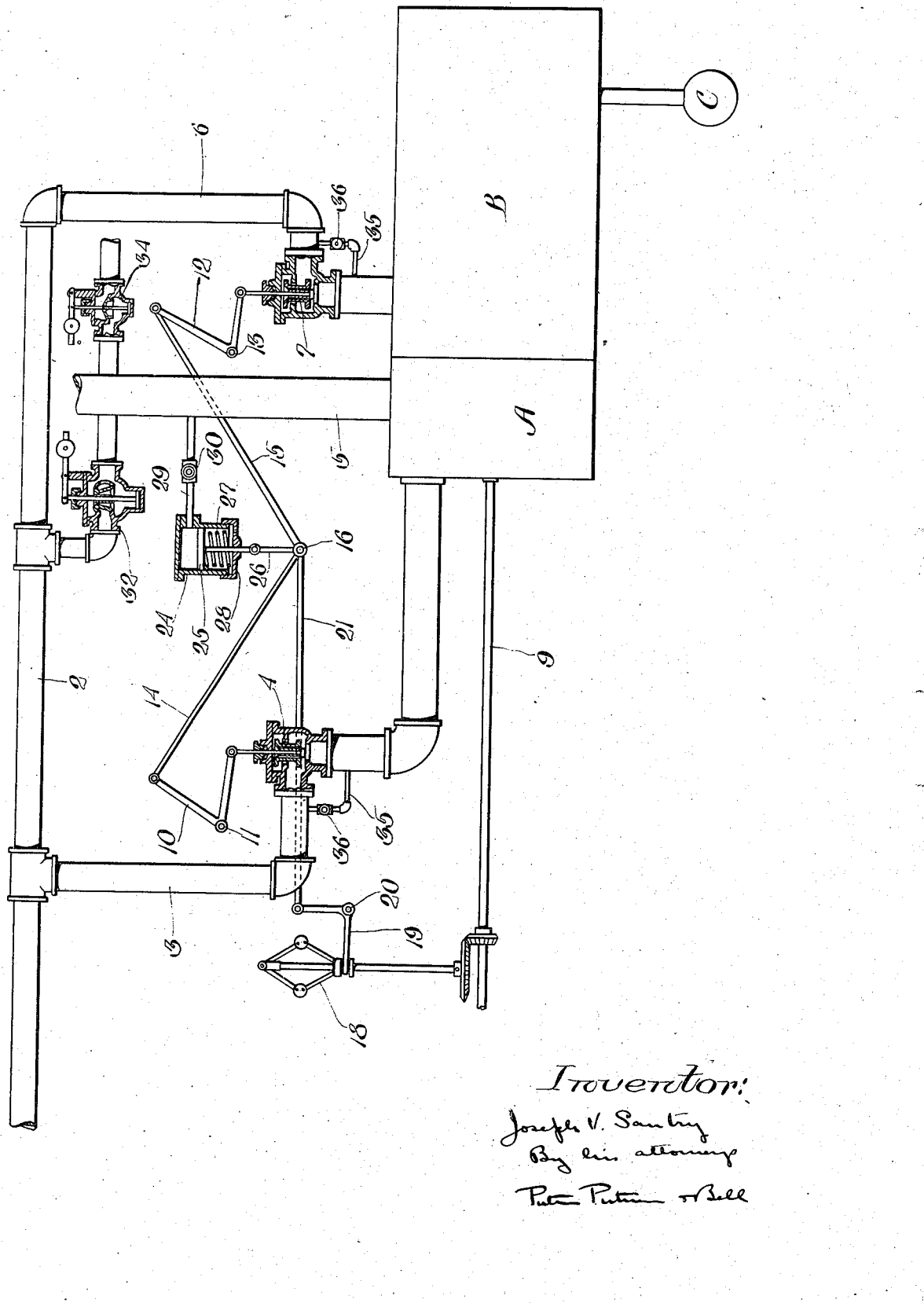

JOSEPH V. SANTRY, OF BOSTON, MASSACHUSETTS.

POWER AND HEATING SYSTEM.

1,185,246.  Specification of Letters Patent.  Patented May 30, 1916.

Application filed September 3, 1915. Serial No. 48,923.

*To all whom it may concern:*

Be it known that I, JOSEPH V. SANTRY, a citizen of the United States, residing at Boston, in the county of Suffolk and State of Massachusetts, have invented certain Improvements in Power and Heating Systems, of which the following description, in connection with the accompanying drawings, is a specification, like reference characters on the drawings indicating like parts in the several figures.

This invention relates to power and heating systems of the general character disclosed in my Patent No. 1,154,210, granted September 21, 1915. In the system shown in that application two steam engines, which may be either of the turbine or reciprocating type, or one of the turbine and the other of the reciprocating type, are arranged to drive a common load and the exhaust from one of the engines supplies steam to a heating system, a controlling mechanism being provided which distributes the load between the engines in such a manner that one engine is allowed to take only enough steam to supply the requirements of the heating system while the other engine takes that part of the load which the first engine is unable to carry at the required speed. In other words, the apparatus is so governed as to meet automatically the requirements both of the heating system and the load. Apparatus of this character proves very economical and finds a wide application in those plants in which it is desired to use exhaust steam for heating purposes.

The present invention has for its chief object to further improve systems of the general character disclosed in my prior application and is directed particularly to meeting the requirements of those plants in which a very close regulation is desired.

A convenient embodiment of the invention will now be described, reference being made to the figure of the accompanying drawings, which shows diagrammatically one system or arrangement of apparatus designed to carry out the invention.

In the drawings, A and B indicate two steam engines which may be either of the turbine or reciprocating type or one may be a turbine and the other a reciprocating engine. For most classes of service it probably will be found advantageous to use turbines, in which case both turbine elements may be inclosed in a single casing. These engines receive their steam from a suitable supply including a steam main 2, the steam being led to the turbine A through a branch pipe line 3 and a valve 4 which controls the flow of steam to the turbine. The exhaust steam from this turbine is carried away through a pipe 5 which also constitutes the main of a heating system. Steam is conducted to the engine B from the main 2 through a pipe line 6 and valve 7 similar to the valve 4 and may be carried away from the engine to a condenser C. These engines drive a common shaft 9 from which the load is driven.

An important part of this system is a controlling or operating mechanism for the valves 4 and 7 which so varies the flow of steam to the engines A and B that it allows the engine A to take only enough steam to supply the requirements of the heating system and yet causes the engines to drive their load at the required speed. This valve controlling mechanism includes both speed governing means driven by the engines and means responsive to changes in pressure in the exhaust from the engine A, that is, in the heating system.

Referring again to the drawings it will be seen that the valves 4 and 7 are connected by a lever system; that is, that the stem of the valve 4 has pivotally connected thereto one arm of a bell crank lever 10 arranged to swing about a stationary fulcrum 11 while the stem of the valve 7 has similarly connected thereto one arm of a bell crank lever 12 also mounted to swing about a stationary fulcrum 13. The opposite arms of these two bell crank levers are connected together by two toggle links 14 and 15 which have a pivotal connection with each other at 16. The speed governing mechanism 18 is of the contrifugal type and is driven by a bevel gear connection with the shaft 9. The sliding sleeve common to speed governors of this type, and which is raised or lowered as the speed is increased or decreased, operates on one arm of a bell crank lever 19 fulcrumed at 20 and having its opposite arm connected by a link 21 to the pivot 16. It will now be evident that, as the speed of the shaft 9 increases, the governor 18 will swing the bell crank lever 19 about its fulcrum 20 in a clockwise direction, thus moving the pivot 16 to the right as the parts are seen in the drawing, and that this movement will be transmitted by the links 14 and 15 to both levers 10 and 12, swinging them about their fulcrums in a clockwise direction, and thus closing both the valves 4 and 7 more or less depending upon the extent of the movement of the governor sleeve. This of course will reduce the flow of steam to both engines A and B, thus reducing their speed. If, however, an abnormal reduction in speed occurs due, for instance, to an increase in load, the governor 18 will act through the lever 19 and link 21 to move the pivot 16 toward the left and this movement will be transmitted through the lever system, causing both valves 4 and 7 to open wider, thus increasing the flow of steam to both engines and consequently increasing their speed. The governor mechanism therefore operates to open or close both the valves 4 and 7 upon a decrease or increase in speed of the engines above or below normal and consequently tends to so vary the flow of steam to them that they will drive their load at a constant speed.

The pressure responsive means above referred to comprises a cylinder 24 in which a piston 25 works, the stem of this piston being connected by a link 26 with the pivot 16. A coil spring 27 bears against one face of the piston 25 and is backed up by a cover plate 28 which is adjustable on the cylinder 24. Opening into the cylinder 24 at the end opposite the spring 27 is a small pipe 29 leading from the exhaust or heating main 5, a hand valve 30 being provided in this pipe to open or close the passage therethrough. The tension of the spring 27 is so adjusted that, when the required pressure is maintained in the exhaust pipe 5, it acts on the piston 25 against the force of the spring 27 to hold this piston and consequently the pivot 16 in a predetermined position. If, now, while the apparatus is running, the demand for exhaust steam in the heating system should increase thus causing a reduction in pressure in the pipe 5, the spring 27 will move the piston 25 upwardly, thus raising the pivot 16 and operating through the link 14 and lever 10 to open the valve 4 wider, at the same time operating through the link 15 and lever 12 to close the valve 7 somewhat. Thus the piston will operate through the lever system and valves 4 and 7 to cause the turbine A to take a sufficiently increased percentage of the load to meet the increased demand for exhaust steam in the heating system. If, however, this demand for exhaust steam should decrease, the pressure in the main 5 would increase, thus acting to depress the piston 25 and consequently operating through the lever system to close the valve 4 slightly and open the valve 7 somewhat, thus shifting enough of the load from the engine A to the engine B to diminish the amount of steam taken by the engine A sufficiently to reduce the pressure in the exhaust main 5 to normal. In other words, this part of the apparatus acts as a pressure regulator and serves to so distribute the load between the engines A and B that the engine A will be allowed to take only enough steam to maintain the pressure in the heating main 5 substantially constant. It should be noted that, inasmuch as the speed governor and pressure responsive device act upon the lever system in directions at right angles to each other, the movements produced by one of these controlling elements do not affect the action of the other.

In order to take care of a condition in which the demand for exhaust steam might be greater than that supplied to meet the requirements of the load, a direct connection between the steam supply main 2 and the heating main 5 is provided and this connection includes a reducing valve 32 which may be of any convenient type and which operates automatically upon any substantial reduction in pressure in the heating system to deliver steam directly from the main 2 to the heating main 5. This valve of course reduces the pressure of steam in passing therethrough to substantially that normally maintained on the heating system. A relief valve 34 also is connected to the heating system 5 for the purpose of taking care automatically of any abnormal rise in pressure in the heating system which might occur due to some accident in the system.

It is desirable to maintain the engines A and B at their operating temperatures even when the load is not sufficient to require the operation of both engines. Accordingly a bypass 35, controlled by a hand valve 36, is provided around each of the valves 4 and 7 to permit the passage of only the amount of steam necessary for this purpose at times in which either turbine is running idly and consequently its respective valve 4 or 7 is shut.

The system above described is susceptible of much variation and modification without departing from its essential principles or characteristics and accordingly it is desired that the specific arrangement herein shown and described be regarded as illustrative rather than limiting.

It will readily be appreciated from an understanding of the apparatus above described that the controlling mechanism will respond very smoothly and quickly to any changes in pressure conditions in the heating system or any changes in the speed of the engines. The apparatus gives that exceedingly close regulation which is desired in many classes of service.

Having thus described my invention, what I claim as new and desire to secure by Letters Patent of the United States is:—

1. In a system of the character described, the combination with two engines, of a steam supply therefor, valve means controlling the flow of steam from said supply to said engines, and a single controlling mechanism for said means constructed and arranged to so distribute the load between said engines as to maintain substantially a constant pressure in the exhaust from one of said engines.

2. In a system of the character described, the combination with two engines, of a steam supply therefor, valve means controlling the flow of steam from said supply to said engines, and a single controlling mechanism for said means constructed and arranged to so distribute the load between said engines as to maintain substantially a predetermined pressure in the exhaust from one of said engines and to cause the engines to drive their load at substantially a predetermined speed.

3. In a system of the character described, the combination with two engines, of a steam supply therefor, two valves controlling, respectively, the flow of steam from said supply to said engines, a speed governing mechanism controlling both of said valves, and means responsive to pressure changes in the exhaust from one of said engines operative also to control said valves.

4. In a system of the character described, the combination with two engines, of a steam supply therefor, two valves controlling respectively the flow of steam from said supply to said engines, a speed governing mechanism driven by said engines and arranged to control the operation of both of said valves, and pressure responsive means operative to control the flow of steam from said supply to said engines.

5. In a system of the character described, the combination with two engines, of a steam supply therefor, two valves controlling respectively the flow of steam from said supply to said engines, a speed governing mechanism driven by said engines, a lever system through which said mechanism is operative to control both of said valves, and means responsive to pressure changes in the exhaust from one of said engines and arranged to operate through said lever system to control the movements of said valves.

6. In a system of the character described, the combination with two engines, of a steam supply therefor, two valves controlling respectively the flow of steam from said supply to said engines; and controlling mechanism for said valves comprising speed governing means operative to open and close both valves upon a decrease or increase respectively in the speed of the engines and means operative upon a change in pressure in the exhaust from one of said engines to open one of said valves while closing the other.

7. In a system of the character described, the combination with two engines, of a steam supply therefor, two valves controlling respectively the flow of steam from said supply to said engines, a lever system connecting said valves, speed governing mechanism and pressure responsive means both connected with said lever system at substantially the same point but operating thereon in different directions, said means being subject to pressure changes in the exhaust from one of said engines.

8. In a system of the character described, the combination with two engines, of a steam supply therefor, valve means controlling the flow of steam from said supply to said engines, and a single controlling mechanism for said means comprising speed governing mechanism operative through said means to vary the flow of steam to said engines in a manner tending to cause them to drive their load at substantially a constant speed and means responsive to changes in pressure in the exhaust from one of said engines and operative through said valve means to distribute the load between said engines in a manner tending to maintain the pressure in said exhaust substantially constant.

9. In a system of the character described, the combination with two engines, of a steam supply therefor, a heating system connected with the exhaust outlet of one of said engines, a condenser connected with the exhaust outlet of the other engine, two valves controlling, respectively, the flow of steam from said supply to said engines, and controlling mechanism for said valves comprising a single speed governing means operative through said valves to vary the flow of steam to said engines in a manner tending to cause them to drive their load at substantially a constant speed, and means responsive to changes in pressure in said heating system and operative through said valves to distribute the load between said engines in a manner tending to maintain the pressure in said heating system substantially constant.

10. In a system of the character described, the combination with two engines, of a steam supply therefor, two valves controlling respectively the flow of steam from said supply to said engines, a speed governing mechanism controlling both of said valves, means responsive to pressure changes in the exhaust from one of said engines operative also to control said valves, and a bypass around each of said valves.

11. In a system of the character described, the combination with two engines, of a steam supply therefor, a heating system supplied with exhaust steam from one of said engines, valve means controlling the flow of steam from said steam supply to said engines, a single controlling mechanism for said valve means constructed and arranged to vary the supply of steam to said engines in such a manner as to maintain substantially a constant pressure in said heating system, and a direct connection between said steam supply and said heating system including a reducing valve operative to supply steam to the heating system whenever the exhaust from said engine is insufficient to meet the demands of the heating system.

12. In a system of the character described, the combination with two engines, of a steam supply therefor, a heating system supplied with exhaust steam from one of said engines, valve means controlling the flow of steam from said steam supply to said engines, a single controlling mechanism for said valve means constructed and arranged to vary the supply of steam to said engines in such a manner as to maintain substantially a constant pressure in said heating system, a direct connection between said steam supply and said heating system including a reducing valve operative to supply steam to the heating system whenever the exhaust from said engine is insufficient to meet the demands of the heating system, and a pressure relief valve connected to said heating system.

In testimony whereof I have signed my name to this specification.

JOSEPH V. SANTRY.